Figure 1:
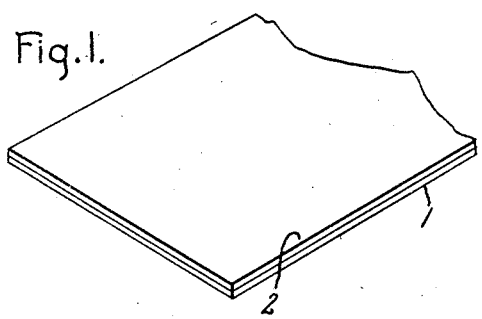

April 16, 1957     W. L. MARSHALL ET AL     2,789,155
ADHESIVE SILICONE RUBBER SHEET MATERIAL AND
TAPES AND METHOD OF PREPARING THE SAME
Filed July 13, 1955 plurality of layers of cured silicone rubber tape

Inventors:
Walter L. Marshall
Leo S. Kohn
by
Their Attorney

United States Patent Office 2,789,155
Patented Apr. 16, 1957

2,789,155

ADHESIVE SILICONE RUBBER SHEET MATERIAL AND TAPES AND METHOD OF PREPARING THE SAME

Walter L. Marshall and Leo S. Kohn, Schenectady, N. Y., assignors to General Electric Company, a corporation of New York Application July 13, 1955, Serial No. 521,826

14 Claims. (Cl. 174—120)

This invention relates to silicone rubber tapes and sheet material. More particularly, the invention is concerned with adhesive silicone rubber sheet materials, such as tapes, composed of a backing of a cured, silica-filled, solid, elastic organopolysiloxane and a heat-curable adhesive layer superposed thereon comprising a substantially uncured, iron-oxide-filled solid, elastic organopolysiloxane.

Tapes and sheet material having pressure-sensitive adhesive qualities are now widely used in many applications for industrial and domestic purposes. Such uses include the wrapping of various types of equipment, particularly electrical equipment, such as electrical conductors, stator bars, etc. In general, these tapes (which term is intended to include sheet material) are limited in their use because of the fact that, being made substantially of organic materials, they have a restricted resistance to elevated temperatures and to corona attack and high voltage stress. In addition, such tapes heretofore known have had the disadvantage that at lower temperatures, for instance, at about −50° to −75° C., they become brittle, and if subjected to an undesirable degree of flexing will crack or delaminate, one layer from the other, thus exposing surfaces to the elements and to other conditions resulting, for instance, in an electrical breakdown of the equipment.

It is therefore one of the objects of this invention to produce a sheet material or tape which may be employed at temperatures in excess of 150° C. and even in excess of 200° C. for long periods of time without any deleterious effects on the tape and without any undesirable deterioration in the electrical properties when such tapes are employed for insulation purposes.

It is a further object of the invention to prepare an elastomeric organopolysiloxane tape which has the requisite strength so that it can be conveniently applied to electrical equipment, particularly electrical conductors.

It is another object of the invention to prepare a sheet material and tape whose physical properties, such as tear strength, adhesion, etc., can be controlled to a high degree and yet can be manufactured readily to yield products of versatile characteristics.

It is a still further object of the invention to encase objects with tapes and sheet material without requiring a separate adhesive being interposed between each laminar layer.

Other objects of the invention will become more apparent from the description which follows.

All the aforesaid objectives are attained in accordance with our invention by forming the tape or sheet material from a backing composed of a cured, silica-filled, solid, elastic organopolysiloxane upon which is superposed a layer of an uncured, iron-oxide-filled, substantially non-tacky, heat-curable, solid, elastic organopolysiloxane. In preparing such elastomeric organopolysiloxane sheet materials (which for brevity, hereafter will be referred to so as to include tapes), it is critical as to the ingredients which are employed to make the sheet material. It is also important that a two-layer system be employed for optimum properties and utility.

We are aware that U. S. Patent 2,708,289, issued May 17, 1955, discloses a pressure-sensitive organopolysiloxane sheet material. The latter pressure-sensitive material is made by heating with steam a single layer of a vulcanizable organopolysiloxane elastomeric material in such a manner that curing of the layer is effected on one side, while on the other side of the layer little or no cure is introduced into the organopolysiloxane. Although such materials may have some utility, they nevertheless are subject to various defects. It is difficult to control the degree of cure from one side of the sheet material to the other so that variations in cure may occur in certain sections of the sheet material. In addition, the flow characteristics of the adhesive side of the tape are poor, and because of this void-free structures are difficult to obtain when such tapes are wound around objects and cured at elevated temperature. Moreover, because of the homogeneity of the composition of the single layer, it is often impossible to have in the same tape high strength properties, such as tensile strength and tear strength, while at the same time having the desirable adhesive and flow characteristics. Also, by employing the one-layer technique, one is not able to have the versatility of variation on the backing and pressure-sensitive sections, as is obviously possible with a two-layer system wherein high strength silicone rubber backing can be used with an uncured organopolysiloxane elastomeric layer of good flow and good adhesive quality.

In accordance with our invention, the backing and adhesive portions of our sheet material are formed of organopolysiloxane elastomeric materials which are composed, prior to vulcanization or curing thereof, of a highly viscous mass or gummy, elastic material convertible to be cured, solid, elastic state by heat in the presence of a suitable vulcanization catalyst. The organic groups of said organopolysiloxane are selected from the class consisting of methyl and phenyl groups, essentially all the organic groups being attached to silicon by carbon-silicon linkages, there being present an average of from about 1.95, preferably from about 1.98 to about 2.05 total organic groups per silicon atom. The presence of small amounts of silicon bonded vinyl groups (e. g., up to 2 mol percent) is not precluded; such organopolysiloxanes are described in Marsden Patent 2,445,794 issued July 27, 1948. These convertible organopolysiloxanes generally comprise polymeric diorganopolysiloxanes in which the siloxane units consist of units of the recurring structural formula $R_2SiO$ where R is a radical of the group consisting of methyl and phenyl radicals. At least 75 to 90 percent of the total number of R groups are preferably methyl radicals. The polysiloxane may be one in which all of the siloxane units are recurring $(CH_3)_2SiO$ units, or the siloxane may be a copolymer of dimethyldisiloxane and a minor molar amount, for example, from 1 to 20 mol percent of any of the following units alone or in combination therewith: $C_6H_5(CH_3)SiO$ and $(C_6H_5)_2SiO$.

The filler used in the backing material is critical for several reasons. It is essential that substantially all the filler be a strongly reinforcing filler so that it imparts high strength characteristics, such as tensile strength, tear strength, etc., to the backing. Accordingly, the reinforcing filler employed is a finely divided silicon filler, such as silica aerogel, fumed silica, precipitated silica, etc. Many of these finely divided silicas, as well as the properties inherent in such fillers, are more particularly described in U. S. Patents 2,541,137, 2,610,167 and 2,657,149.

Specific sources of these finely divided silica fillers are, for instance, HiSil X–303 which is a precipitated silica sold by Columbia Southern Corporation and which has an average particle diameter of about 22 microns and a surface area of 160 m.$^2$/g.; Santocel CS sold by Monsanto Chemical Company which is a silica aerogel of average particle diameter of about 30 microns and having a surface area of 110–150 m.$^2$/g.; Cab-O-Sil sold by Godfrey L. Cabot Company having an average diameter of 15 to 20 microns and a surface area of 175–200 m.$^2$/g.; Estersil which is a butyl alcohol-treated finely divided silica manufactured by the Du Pont Company having an average particle diameter of 8–10 microns and a surface area of 300 m.$^2$/g. The combination of this filler with small amounts (e. g., up to 10 percent, by weight, of the silica filler) of other finely divided filler is not precluded. Such fillers include iron oxide ($Fe_2O_3$), calcium carbonate, etc. The proportions of ingredients used to make the backing for the sheet material are advantageously within the following ranges, in which all parts are by weight:

TABLE I

| | Parts |
| --- | --- |
| Elastomeric organopolysiloxane | 100 |
| Finely divided silica filler | 25–60 |
| Other finely divided fillers | 0–6 |
| Curing agent | 0.5–4 |

The curing agent employed for making the backing is advantageously benzoyl peroxide, tertiary butyl perbenzoate dichlorobenzoyl peroxide, dicumyl peroxide, etc., or mixtures of these peroxides. Combinations of these curing agents within the weight ranges described in the above Table I have been found to give improved properties, particularly increased adhesion of the backing to the unvulcanized, superposed layer.

The cured organopolysiloxane backing is advantageously obtained by calendering the heat-curable organopolysiloxane to be used as the backing. This is advantageously accomplished by passing the compound over a series of rolls at least one of which is heated to a surface temperature ranging from about 150° to 250° C. The contact time of the heat-curable organopolysiloxane with the heated surface of the roll is of such order that after passage thereover, the backing layer is in the substantially cured state. This may require passage of the organopolysiloxane layer over the heated roll one or more times in which contact between the organopolysiloxane and the heated metal surface of the roll may vary, for instance, from about 0.5 to 2 minutes or more until the backing layer is in the substantially cured, solid, elastic state. The procedure for accomplishing this is relatively simple and it will be readily apparent to persons skilled in the art. Employing such means, one can obtain thin sheets or tapes ranging in thickness from about 0.001″ to about 0.025″ or more. After passing over the heated roll and before removing from the rolls, the sheet material is cooled prior to winding it up in order to avoid blocking (or sticking) between contacting successive layers of the backing. The use of interlayers in this step, such as suitably treated paper, polyethylene, etc., is not precluded. It will, of course, be apparent to those skilled in the art that other methods for calendering or preparing the backing may be employed without departing from the scope of the invention. Instead of passing the backing over a heated roll, if desired, the backing may be extruded or rolled out into the desired thickness and thereafter passed into a heated oven maintained at an elevated temperature and moving the backing at a suitable rate so that upon exit from the oven it will have been cured to the desired state.

The organopolysiloxane component of the adhesive layer and of the backing layer, is generally obtained by condensing an organopolysiloxane or mixture of organopolysiloxanes comprising the requisite silicon-bonded organic substituents selected from the class consisting of monovalent methyl or phenyl radicals, or both radicals, attached to silicon through carbon-silicon linkages. As starting materials for making these organopolysiloxanes, one can condense, for instance, octamethylcyclotetrasiloxane or mixtures of cyclic dimethylsiloxanes, such as mixtures of hexamethylcyclotrisiloxane, octamethylcyclotetrasiloxane, decamethylcyclopentasiloxane, etc., in the presence of small amounts (e. g., from 0.001 to 0.1 percent, by weight) of alkaline materials, such as potassium hydroxide, cesium hydroxide, tetrabutyl phosphonium hydroxide, etc., until a highly viscous, substantially nonflowing polymer is obtained. When making heat-convertible methyl phenylpolysiloxane elastomeric materials, such materials can be obtained by intercondensing one or more of the above-described cyclic methylpolysiloxanes with cyclic phenylpolysiloxanes in which the silicon atoms may have only phenyl groups attached thereto, or both phenyl and methyl groups as, for instance, octaphenylcyclotetrasiloxane, of the formula, $[(C_6H_5)_2SiO]_4$, tetraphenyltetramethylcyclotetrasiloxane having the formula $$[(C_6H_5)(CH_3)SiO]_4$$

etc. The same condensing agents recited above may be employed for these purposes. U. S. Patent 2,704,748—Pfeifer more particularly describes the preparation of organopolysiloxanes convertible to the cured, solid, elastic state employed in the practice of the present invention.

The curable adhesive flowable portion is then prepared by mixing the heat-curable organopolysiloxane with a finely divided red iron oxide ($Fe_2O_3$) filler in an amount 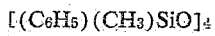 equal to from 25 to 100 parts, by weight, per 100 parts of the organopolysiloxane, and a small amount of a curing agent therefor composed of one or more of the above-mentioned peroxides in amounts ranging, by weight, from about 0.5 to 8% or more of the curing agent based on the total weight of the iron oxide filler and methylpolysiloxane. The iron oxide particles are preferably essentially all of average particle size varying from 10 to 50 microns or somewhat larger in size and essentially all should pass through a 325 mesh, U. S. sieve number. In addition, for optimum attainment of properties of the adhesive, there is also incorporated a minor proportion of finely divided reinforcing silica filler (such as described above) in an amount ranging from 10 to 45% of the weight of the iron oxide.

The concomitant choice of the major proportion of finely divided red iron oxide and the minor proportion of finely divided silica is based on consideration of certain critical factors in which the iron oxide is believed to perform several important unexpected functions. As is well known, finely divided silica fillers when incorporated in heat-convertible, vulcanizable silicone gums cause the formation of nerve or structure (as evidenced by the appearance of undesirable snap and difficulty in rendering plastic the rubber compound by usual mechanical working). The presence of the major proportion of the iron oxide prevents the structure formation and gives to the adhesive layer a smooth, flowable consistency, and yet imparts sufficient cohesive properties to the adhesive layer so that it is not smeary, and has a laminar formation with the backing essential in certain aspects of the claimed invention, whereby it may be desirable to roll up the sheet material upon itself. The finely divided silica present in the adhesive layer gives the necessary primary strength and contributes to the cohesion recited above.

In addition, because of the flowability and plasticity of the adhesive layer due to the presence of the iron oxide, the use of the sheet material or tape in applications where it is wrapped or wound around, for instance, bodies such as mandrels, electrical conductors, etc., imparts sufficient flow to the adhesive layer to form essentially void-free structures, upon the application of heat and pressure. An additional function which the red iron oxide is believed to perform is the improvement in adhesion both in the unvulcanized state and in the vulcanized state of the adhesive layer to the backing either prior to wrapping or winding or after wrapping or winding when it is essential that a good bond be formed between the adhesive layer and either a surface to which it may be adhered or to the cured vulcanized silicone rubber backing. Finally, it is believed that the ability to reduce tackiness and blocking of the adhesive layer and yet maintain its good adhesive characteristics and the other desirable properties recited above, are due to the presence of the major proportion of the red iron oxide. The adhesive sheet materials of the present invention can be stored at normal temperatures of from 25 to 35° C. for long periods of time without apparent change in the desirable properties of the material or in the ability of the sheet material to be subsequently cured to strong, unitary cross-sectional structures.

In preparing the adhesive sheet material, the layer of cured, elastomeric organopolysiloxane backing is coated, for instance, by knife coating or by calendering the latter, with a layer of the uncured adhesive material. To facilitate application of the adhesive layer, it may be desirable to dissolve or disperse the adhesive portion in a suitable solvent, such as xylene and toluene, and after application to the backing, the adhesive layer is advantageously subjected to a slight heat treatment either alone or accompanied by forced air circulation to remove the solvent. Slight application of heat will also serve the purpose of reducing the tackiness of the adhesive layer. The thickness of the adhesive layer may vary within the same ranges as the backing although, for practical purposes, the adhesive layer may be thinner (preferably from 0.003" to 0.015") than the backing.

The two-layer laminated adhesive sheet material is then employed in such applications as, for instance, in the insulation of electrical conductors by wrapping the conductor with the sheet or tape material of this invention. In making use of a tape, this is generally accomplished by first rolling up the tape upon itself and thereafter continuously unwinding it while simultaneously wrapping it around the conductor. Often this manner of conductor insulation is the only practical manner of conveniently applying insulation to a conductor. Once the tape is applied to the base member, such as the electrical conductor, it can then be subjected to further vulcanization (advantageously under pressure) by heating it to a temperature of above 100° C., for instance, at temperatures of from 125° to 200° C., for times varying from about 5 minutes to three or four hours, either within or outside a mold (employing steam vulcanization if desired), whereupon the overlapped layers of the tape will fuse to form a unitary, substantially void-free insulation around the conductor. Because of the ability to use backings of high-strength characteristics, particularly tensile and tear strength, conductors insulated in the above fashion can be used in winding operations at high speeds or can be thereafter bent or manipulated, particularly when used to insulate stator bars and coils prior to insertion in the larger electrical equipment for which the stator bars were fabricated.

In order that those skilled in the art may better understand how the present invention can be practiced, the following examples are given by way of illustration and not by may of limitation. All parts and percents are by weight.

*Example 1*

A heat-curable methylpolysiloxane was prepared by polymerizing mixed cyclic polymers of dimethylsiloxane of the formula $[CH_3)_2SiO]_n$ where $n$ is an integer equal to from 3 to 6, with about 0.01 percent potassium hydroxide at a temperature of about 150° to 160° C. until a soft highly viscous, substantially non-flowing methylpolysiloxane convertible to the cured solid elastic state was obtained. To 100 parts of this methylpolysiloxane were added about 50 parts of a finely divided fumed silica (prepared in the vapor phase by burning $SiCl_4$, and known as "Aerosil" or "Cab-O-Sil," sold by Godfrey L. Cabot Company, Boston, Mass.) and about 1.1% 2,4-dichlorobenzyl peroxide, based on the weight of the filled compound. This material was then passed between squeeze rolls and reduced to the form of a thin film about 1 foot wide and 0.010" thick, and thereafter cured at a temperature of about 180° C. for about 30 seconds to obtain a film which was in the substantially fully cured state.

An adhesive mixture was prepared by condensing octamethylcyclotetrasiloxane with potassium hydroxide under the same conditions as recited above to obtain a high viscosity, substantially non-flowing, benzene-soluble polymer. With 100 parts of this latter polymer were mixed about 65 parts of finely divided red iron oxide, 20 parts finely divided diatomaceous earth, and 1.5% 2,4-dichlorobenzoyl peroxide, based on the weight of the filled compound. This adhesive mixture was then applied to the cured methylpolysilorane backing recited above to a thickness of about 0.0075" to form a unitary two-layer structure. To reduce the tackiness and blocking of the adhesive layer, the sheet was exposed to a heat treatment for a few seconds at a temperature of around 115° to 120° C. This sheet was then slit into a tape about 1" wide and the tape was identified as tape No. 1.

*Example 2*

A backing was prepared similarly as in Example 1 with the exception that the finely divided silica was a precipitated silica sold by Columbia Southern Corporation under the name HiSil X–303. The finely divided silica was incorporated in an amount equal to about 35 parts per 100 parts of the methylpolysiloxane together with about 2 parts red iron oxide and 1% 2,4-dichlorobenzoyl peroxide, based on the weight of the filled compound. The thickness of the cured backing in this case was about 0.0095". An adhesive layer was applied to the backing in the same manner as described in Example 1 employing a similar methylpolysiloxane for adhesive purposes, together with the same amount of finely divided red iron oxide and silica. However, instead of using the dichlorobenzoyl peroxide, there was employed a mixture of 1.1% benzoyl peroxide and 0.6% tertiary butyl perbenzoate, both based on the weight of the filled methyl polysiloxane. The thickness of the adhesive on the cured silicone rubber backing was 0.0095". This adhesive sheet material (which was also heated slightly to reduce tackiness and blocking tendencies) was slit into a tape and identified as tape No. 2.

*Example 3*

An adhesive tape was prepared similarly as described in Example 2, using the same backing and adhesive and the same thicknesses of each layer as described in Example 2. The thickness of the cured and uncured layers was the same. The only difference was that the methylpolysiloxane used in making the backing was washed with water to remove traces of the potassium hydroxide polymerizing agent. This adhesive tape (which was heated slightly as in Examples 1 and 2) was identified as tape No. 3.

*Example 4*

A silicone rubber adhesive tape was prepared similarly as in Example 1 employing the same backing as that described in Example 1; the thickness of the backing was 0.008". The adhesive layer was essentially the same as that described in Example 1 with the exception that 1.1% benzoyl peroxide and 0.6% tertiary butyl perbenzoate were employed in place of the 1.5% dichlorobenzoyl peroxide described for the adhesive in Example 1. The adhesive layer deposited on the backing was 0.004" thick. This adhesive tape (which was heat-treated slightly to reduce tack and blocking) was identified as tape No. 5.

Example 5

An adhesive tape was prepared similarly as in Example 1 with the following exceptions. The adhesive portion was identical with that described in Example 4 with the exception that the thickness of the adhesive layer was about 0.006″. The backing portion was composed of a methyl phenylpolysiloxane obtained by polymerizing a mixture composed of about 85 mol percent octamethyl-cyclotetrasiloxane and about 15 mol percent of a cyclic phenyl methylpolysiloxane having the formula $$[(C_6H_5)(CH_3)SiO]_4$$

at a temperature about 160° C. for about 25 minutes in the presence of potassium hydroxide as a polymerizing catalyst in an amount substantially equal to that used in Example 1. The viscous, substantially non-flowing methyl phenylpolysiloxane thus obtained was heated at a temperature sufficiently high to remove essentially all volatile materials boiling below 250° C. To 100 parts of this high molecular weight methyl phenylpolysiloxane were added 45 parts of a finely divided silica identified as Estersil (manufactured by the Du Pont Company, which comprised a butanol-treated silica, the preparation of which is more particularly described in U. S. Patent 2,657,149). To this filled methyl phenylpolysiloxane there were also added 2 parts finely divided red iron oxide (for pigmentation purposes) and 1.2% 2-4-dichlorobenzoyl peroxide based on the weight of the filled methyl phenylpolysiloxane. The thickness of the cured silicone rubber backing was 0.013″. This sheet material (which was heated slightly as was done above to reduce tackiness and blocking) was slit into a tape and the latter identified as tape No. 5.

Each of the tapes described in Examples 1 to 5 was tested for dielectric break-down, tear strength, tensile strength, percent elongation and bond strength. The dielectric break-down was tested as follows: The tape was wrapped in a half lap fashion around an electrical grade copper bar ¼″ x 1″ in cross section and heated at 150° C. for 10 minutes during which time a pressure of about 100 p. s. i. was applied to the surface of the wrapped bar; after this the dielectric break-down (step by step) of the insulated bars was determined. The tear strength, tensile strength and percent elongation were determined in the usual manners well known in the art, on the tape itself (composed of the cured backing and uncured adhesive section). The bond strength was determined by laminating adjacent portions of each tape through the medium of the adhesive section of one sample to the backer section of the other sample in such a manner that one end of each portion of the tape was left free to be inserted in a Scott tester, whereby pull could be exerted on each end in opposite directions so as to attempt to delaminate the bond. Prior to testing, the superposed portions were cured by heating at 150° C. for 30 minutes at about 100 p. s. i. pressure. The following Table II shows the results of these various tests. In this table, dielectric break-down values are shown for varying wall thicknesses of the insulation on the copper bar, which are recited in the parentheses underneath each dielectric break-down value:

Table II

| Tape No. | Dielectric Break-down, Volts/Mil | Tear Strength, Lbs./in. | Tensile, P. s. i. | Percent Elongation | Bond Strength, Lbs./in. |
|---|---|---|---|---|---|
| 1 | 390 (0.062″) | 43.0 | 305 | 320 | 4.9 |
| 2 | 450 (0.062″) | 36.5 | 355 | 255 | 7.0 |
| 3 | 375 (0.069″) | 27.5 | 350 | 275 | 7.0 |
| 4 | 425 (0.040″) | 27.0 | 345 | 290 | 2.8 |
| 5 | 320 (0.075″) | 43.5 | 370 | 390 | |

An adhesive tape prepared similarly as in Example 1 or 5, but using for the adhesive portion of the tape only a finely divided silica, such as the above-described fumed silica, as the only filler for the adhesive portion of the tape, did not have the stability or flowability of the other adhesive portions of the above-described tapes. Thus, whereas samples of tapes 1 to 5 could be wound upon themselves and left in this state for weeks on end and then could be unwound and used for protective or insulating purposes without any apparent change in the ability of the adhesive portion to flow and bond readily both to the backing and to surfaces to which the adhesive tape was applied, the tapes in which the filler of the adhesive portion was composed essentially of only a finely divided silica, lost this ability to flow and to bond after standing in the rolled-up state for only two to three days, so that after this period of time their use as adhesive tapes was practically valueless.

It will, of course, be apparent to those skilled in the art that other types of finely divided silica, in addition to those described in the examples as comprising the bulk of the organopolysiloxane backing, may be used without departing from the scope of the invention. Incorporation of other types of finely divided filler, such as calcium carbonate, iron oxide, titanium dioxide, etc., in small amounts, preferably not exceeding 5 to 8% of the total weight of the filler, is not precluded in making the backing. It is also intended, within the scope of the invention, to use other curing agents for the organopolysiloxane adhesive and backing in place of or in combination with those recited in the foregoing examples. In making the adhesive, small amounts of other fillers in addition to the major proportion of the red iron oxide filler and the minor proportion of the finely divided silica may be employed as long as the amount is small enough so as not to effect harmfully the properties of the adhesive; for this purpose, amounts of from 0 to 5 or 10% of the other finely divided fillers, based on the weight of the red iron oxide, may be used in many instances without deleterious effect.

It will also be apparent to those skilled in the art that other techniques for making the laminated silicone rubber adhesive sheet material and tape, in addition to those described in the above-identified examples, may be employed without departing from the scope of the invention. In particular, caution should be observed in the treatment of the adhesive sheet material and tape so as to reduce the tackiness of the adhesive layer to a point where it will not stick ("block") to the cured backing in the event that the tape or sheet material should be wound upon itself. Although anti-blocking interlayers may be employed for this purpose, nevertheless such interlayers (for example, cellophane, polyethylene) add to the cost and complexity of the commercial manufacture and use of the sheet material and adhesive tape. To avoid this, we have found, as pointed out in the above examples, that a slight heat treatment of the adhesive sheet material on tape will cause reduction in the tackiness and blocking of the surface of the adhesive portion so that the sheet material on tape can be wound upon itself and left in this position for long periods of time without any undesirable difficulty being encountered when the sheet material on tape is unrolled. The heat treatment which we have found to be specially suitable comprises passing the adhesive sheet material over a heated metallic roll maintained at a temperature of about 125° to 150° C. whereby the heat penetrates from the outside portion of the backer layer through the backer and thence at a reduced temperature level through the adhesive layer. At these temperatures and employing such a technique, it is only necessary to maintain an adhesive tape for from 20 to 40 seconds in order to obtain the desirable reduction in tackiness and blocking characteristics. This treatment does not harm the adhesive characteristics of the tape.

Because our adhesive sheet material and tapes have an adhesive layer which has good flow and exhibits little evidence of structure ("nerve"), such tapes and sheet material yield, upon curing, unitary articles having improved interlaminar bond strength and substantially void-free structures. In addition to forming ground insulation for motor and generator coils whereby advantage can be taken of the high resistance of silicone rubber to corona and exposure to long-time application of high voltage electrical stress, one can also employ these tapes in the fabrication of hoses, or similar articles. Adhesive sheet materials or tapes may be wrapped on a cylindrical form or mandrel and then subjected to heat and pressure (the pressure may be omitted if desired) to form a hose which is substantially void-free in the walls thereof, and is greatly heat-resistant.

The sheet materials and tapes of the instant invention can be used to insulate metallic conductors (e. g., copper, aluminum, etc.) to give insulated products having good heat resistance and electrical properties. In addition, these sheet materials and tapes can be used to insulate stator bars or coils by wrapping the sheet material or tape around a plurality of insulated conductors and then heat treating the assembly under heat and pressure in the same manner as described in Richardson and Zavist U. S. 2,707,204 issued April 26, 1955, and assigned to the same assignee of the present invention.

Figure 2:
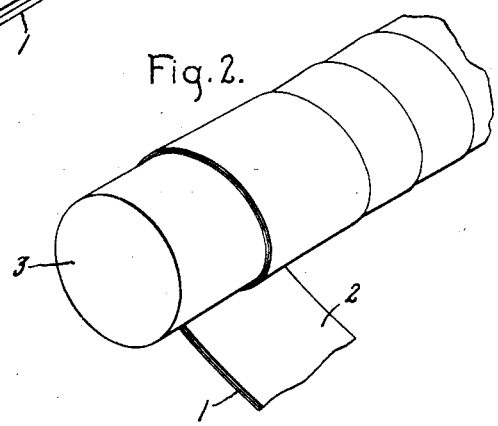
Figure 3:
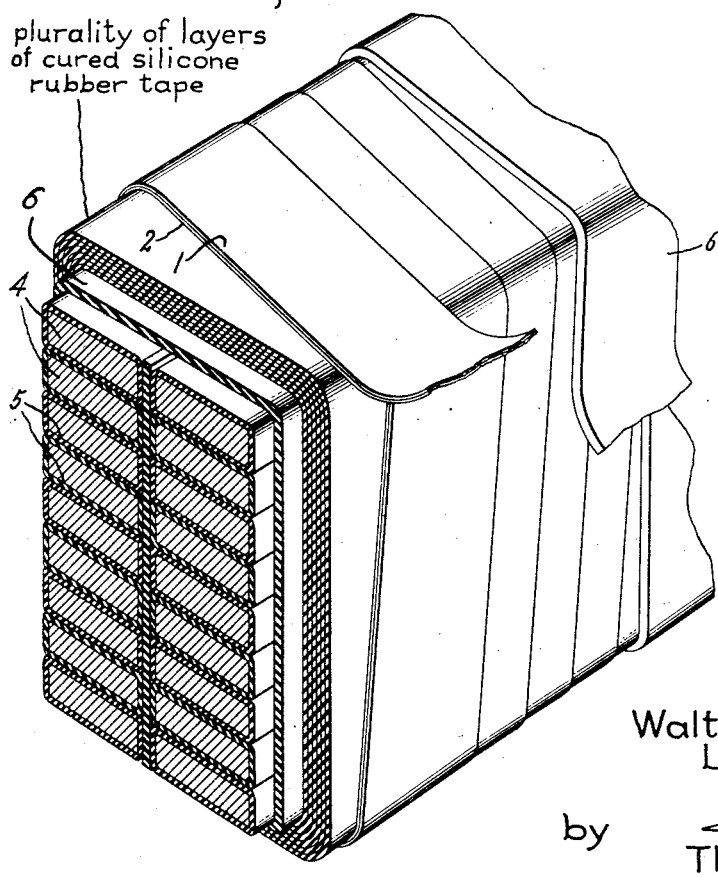

The accompanying drawing shows a view of the adhesive tape described above as well as two embodiments directed to the use of the sheet materials and tapes of our invention. Figure 1 is a perspective cross-sectional view of the adhesive sheet material. Figure 2 is a perspective cross-sectional view of an electrical conductor insulated with the sheet material or tape described above. Figure 3 is a perspective cross-sectional view of an armature winding insulated with the above-described silicone rubber tape.

More particularly, Figure 1 shows a heat-curable adhesive tape of the type described above in which is found a backing 1 composed of a cured, elastomeric organopolysiloxane containing as a filler a finely divided silica, and an adhesive layer 2 composed of an organopolysiloxane convertible by heat to the cured, solid, elastic state and containing, in addition to a curing agent for the organopolysiloxane, a mixture of finely divided fillers composed of the major proportion of red iron oxide and a minor proportion of silica.

Figure 2 shows an electrical conductor composed of a metallic core 3 (e. g., copper, aluminum, etc.) around which is wound in lapped fashion the silicone rubber tape in which the adhesive portion thereof 2 is in closest proximity to the conductor core while the cured backing 1 serves as a protective layer until the entire assembly is heat-treated to convert the heat-curable adhesive layer also to the cured, solid, elastic state.

Figure 3 shows an armature winding composed of a plurality of conductor turns 4 insulated from each other by a turn insulation 5. In each conductor turn 4 is a single wire or strap of copper; the insulation on the conductor turns may be composed of a resinous insulating coating such as shellac or asphaltic varnish either alone or in combination with a wrapping of glass fabric, asbestos or the like or other insulation. Untreated glass fibers or other inorganic insulation is often sufficient. Wrapped around the armature winding bar is at least one layer of a glass fiber tape or sheet material 6 which is coated and impregnated with a heat-curable filled organopolysiloxane, for instance, a heat-curable methylpolysiloxane, similar to that described for either the backing 1 or for the adhesive portion 2 of the above-described sheet material and tape of Figure 1. Incorporated in the organopolysiloxane coating and impregnating the glass fibrous material is a curing agent such as benzoyl peroxide or tertiary butyl perbenzoate. Wrapped around the glass tape layer is a plurality of lapped layers of the above-described organopolysiloxane adhesive sheet material or tape, in which the adhesive layer 1 is in direct contact with the glass tape layer and the backing 2 forms the outer layer. Finally wrapped around the silicone rubber adhesive tape is another layer of the aforementioned glass fiber tape or sheet material 6 coated and impregnated with the heat-curable organopolysiloxane. After wrapping, the total assembly is covered with a sacrifice tape which is essentially non-adhering to the insulating outer glass fiber-silicone rubber tape, and which acts as a protective coating for the insulated winding when the entire assembly is immersed in a pressure tank to which is added under pressure a pressurizing and heating fluid (e. g., molten bitumen or other material). Where practical, mechanical molding of the insulated winding may also be used. After treatment in the pressure tank, the winding is removed therefrom and the sacrifice tape and any adhering asphalt is stripped from the outer insulation of the winding.

What we claim as new and desire to secure by Letters Patent of the United States is:

1. A curable adhesive sheet material composed of (1) a backing comprising a cured, elastomeric organopolysiloxane filled with a finely divided silica filler and (2) a heat-curable adhesive coating upon said backing comprising a substantially tack-free and non-blocking layer composed of (a) an uncured elastomeric organopolysiloxane filled with (b) a mixture of finely divided fillers composed of a major proportion of red iron oxide and a minor proportion of a reinforcing silica filler, and (c) a curing agent for the organopolysiloxane, the organic groups of said organopolysiloxanes in (1) and (2) being selected from the class consisting of methyl and phenyl groups, there being present from about 1.98 to 2.05 organic groups per silicon atom attached to silicon by carbon-silicon linkages.

2. A curable adhesive sheet material composed of (1) a backing comprising a cured elastomeric methylpolysiloxane filled with a finely divided silica filler and (2) a heat-curable adhesive coating upon said backing comprising a substantially tack-free and non-blocking layer composed of (a) a substantially uncured elastomeric methylpolysiloxane filled with (b) a mixture of finely divided fillers composed of a major proportion of red iron oxide and a minor proportion of a reinforcing silica filler, and (c) a curing agent for the methylpolysiloxane, there being present in both the methyl polysiloxanes of (1) and (2) from about 1.98 to 2.05 methyl groups per silicon atom attached to silicon by carbon-silicon linkages.

3. A curable adhesive sheet material composed of (1) a backing comprising a cured elastomeric methylpolysiloxane filled with a finely divided silica filler and (2) a heat-curable adhesive coating upon said backing comprising a substantially tack-free and non-blocking layer composed of (a) a substantially uncured elastomeric methyl phenylpolysiloxane filled with (b) a mixture of finely divided fillers composed of a major proportion of red iron oxide and a minor proportion of a reinforcing silica filler, and (c) a curing agent for the methyl phenylpolysiloxane, there being present in both the organopolysiloxanes of (1) and (2) from about 1.98 to 2.05 organic groups per silicon atom attached to silicon by carbon-silicon linkages.

4. A curable adhesive sheet material as in claim 1 in which the curing agent for the organopolysiloxane in the adhesive coating is benzoyl peroxide.

5. A curable adhesive sheet material as in claim 1 in which the curing agent for the organopolysiloxane in the adhesive layer is 2,4-dichlorobenzoyl peroxide.

6. The heat-converted product of claim 2.

7. The heat-converted product of claim 3.

8. A curable adhesive tape composed of (1) a backing comprising a cured elastomeric methylpolysiloxane filled with a finely divided silica filler and (2) a heat-curable adhesive coating upon said backing comprising a substantially tack-free and non-blocking layer composed of (a) a substantially uncured elastomeric methyl phenylpolysiloxane filled with (b) a mixture of finely divided fillers composed of a major proportion of red iron oxide and a minor proportion of a reinforcing finely divided silica filler, and (c) a curing agent for the methyl phenylpolysiloxane comprising 2,4-dichlorobenzoyl peroxide, there being present in each of the organopolysiloxanes of (1) and (2) from about 1.98 to 2.05 organic groups per silicon atom attached to silicon by carbon-silicon linkages.

9. The process for making an adhesive sheet material curable to the solid, elastic state which comprises (1) forming a backing comprising a cured elastomeric organopolysiloxane filled with a finely divided silica filler and (2) applying to said backing a heat-curable adhesive coating comprising a substantially tack-free and non-blocking layer composed of (a) an uncured elastomeric organopolysiloxane filled with (b) a mixture of finely divided fillers composed of a major proportion of red iron oxide and a minor proportion of a reinforcing silica filler and (c) a curing agent for the organopolysiloxane, the organic groups of the organopolysiloxane in both the backing and adhesive layer being selected from the class consisting of methyl and phenyl groups, there being present from about 1.98 to 2.05 organic groups per silicon atom attached to silicon by carbon-silicon linkages.

10. A process as in claim 9 in which the organopolysiloxane in both the backing and in the adhesive layers is a methylpolysiloxane in which there are present from about 1.98 to 2.05 methyl groups per silicon atom attached to silicon by carbon-silicon linkages.

11. A process as in claim 9 in which the organopolysiloxane of the backing material is a methyl phenylpolysiloxane containing from about 1.98 to 2.05 total methyl and phenyl groups per silicon atom attached to silicon by carbon-silicon linkages.

12. A process as in claim 9 in which the curing agent for the organopolysiloxane used to make the adhesive layer is selected from the class consisting of benzoyl peroxide, tertiary butyl perbenzoate, dichlorobenzoyl peroxide, dicumyl peroxide, and mixtures of at least two of the aforesaid peroxides.

13. In combination, an electrical conductor and insulation applied to the electrical conductor, the insulation being composed of a heat-treated tape wrapped around said conductor composed of (1) a backing comprising a cured, elastomeric organopolysiloxane filled with a finely divided silica filler and (2) a heat-curable adhesive coating upon said backing comprising a substantially tack-free and non-blocking layer composed of (a) a substantially uncured elastomeric organopolysiloxane filled with (b) a mixture of finely divided fillers composed of a major proportion of red iron oxide and a minor proportion of a reinforcing silica filler, and (c) a curing agent for the organopolysiloxane, the organic groups of said organopolysiloxanes in (1) and (2) being selected from the class consisting of methyl and phenyl groups, there being present from about 1.98 to 2.05 organic groups per silicon atom attached to silicon by carbon-silicon linkages.

14. An electrical assembly comprising a plurality of superimposed strands of copper insulated from each other and containing a plurality of outer insulating layers composed of (1) a layer composed of glass fiber tape coated and impregnated with a cured, solid, elastic, filled organopolysiloxane (2) a plurality of layers comprising a heat-treated curable adhesive sheet material composed of (a) a backing comprising a cured, elastomeric organopolysiloxane filled with a finely divided silica filler and (b) a heat-curable adhesive coating upon said backing comprising a substantially tack-free and non-blocking layer composed of (A) a substantially uncured elastomeric organopolysiloxane filled with (B) a mixture of finely divided fillers composed of a major proportion of red iron oxide and a minor proportion of a reinforcing silica filler, and (C) a curing agent for the organopolysiloxane, the organic groups of said organopolysiloxanes in (a) and (b) being selected from the class consisting of methyl and phenyl groups, there being present from about 1.98 to 2.05 organic groups per silicon atom attached to silicon by carbon-silicon linkages, and (3) an outer insulating layer composed of the same cured organopolysiloxane-coated and impregnated glass tape described in (1) above.

References Cited in the file of this patent

UNITED STATES PATENTS

| | | |
|---|---|---|
| 2,419,095 | Stevens | Apr. 15, 1947 |
| 2,601,016 | Hendricks et al. | June 17, 1952 |
| 2,601,212 | Polydoroff | June 17, 1952 |
| 2,601,337 | Smith-Johansen | June 24, 1952 |
| 2,605,328 | Pintell | July 29, 1952 |
| 2,707,204 | Richardson et al. | Apr. 26, 1955 |
| 2,708,289 | Collings | May 17, 1955 |
| 2,732,318 | Keil | Jan. 24, 1956 |
| 2,736,721 | Dexter | Feb. 28, 1956 |